United States Patent [19]

Sirven

[11] Patent Number: 4,972,928
[45] Date of Patent: Nov. 27, 1990

[54] HYDRAULIC DAMPER WITH VARIABLE OPERATING CHARACTERISTICS

[76] Inventor: Jacques M. M. Sirven, 34, Rue de l'Orangerie, 78000 Versailles, France

[21] Appl. No.: 217,360

[22] Filed: Jul. 11, 1988

[30] Foreign Application Priority Data

Jul. 21, 1987 [FR] France ............................ 87 10311

[51] Int. Cl.⁵ .......................... F16F 9/06; F16F 9/50; F16F 9/34
[52] U.S. Cl. .................... 188/269; 188/282; 188/322.14
[58] Field of Search ............ 188/322.14, 322.15, 188/299, 315, 314, 279–282, 269; 280/707, 714

[56] References Cited

U.S. PATENT DOCUMENTS

| | | | |
|---|---|---|---|
| 2,182,016 | 12/1939 | Deutsch | 188/319 |
| 2,678,114 | 5/1954 | Koning et al. | 188/319 |
| 4,054,277 | 10/1977 | Sirven | 188/315 X |
| 4,407,396 | 10/1983 | Sirven | 188/282 |
| 4,469,315 | 9/1984 | Nicholls et al. | 188/299 X |
| 4,506,869 | 3/1985 | Masclet et al. | 188/269 X |
| 4,749,068 | 6/1988 | Sirven | 188/322.15 X |

FOREIGN PATENT DOCUMENTS

| | | |
|---|---|---|
| 0003290 | 8/1979 | European Pat. Off. . |
| 0185389 | 6/1986 | European Pat. Off. . |
| 0207409 | 1/1987 | European Pat. Off. . |
| 354053 | 7/1986 | Fed. Rep. of Germany . |
| 2287627 | 5/1976 | France . |
| 58-72744 | 4/1983 | Japan . |
| 0179315 | 9/1985 | Japan .................... 188/315 |
| 2014693 | 8/1979 | United Kingdom . |

*Primary Examiner*—Robert J. Oberleitner
*Attorney, Agent, or Firm*—Beveridge, DeGrandi & Weilacher

[57] ABSTRACT

A damper includes a cylinder containing a hydraulic fluid inside which is a piston defining first and second chambers in the cylinder, the second chamber containing the piston rod. A hydraulic fluid reservoir communicates selectively with the first chamber. A reference chamber contains a gas at substantially constant pressure. A control valve is acted on by the pressure of fluid in the first chamber (tending to open the valve), by a return spring, by the pressure in the reference chamber and by the pressure of fluid in the second chamber (tending to close the valve). A flow restrictor between the reservoir and the first chamber enables hydraulic fluid to flow only from the first chamber to the reservoir. It defines a control pressure to open the valve in response to the rate of inward movement of the piston rod exceeding a predetermined limit value. The flow rate permitted by the flow restrictor is variable so that the valve can open at rates of inward movement different to the predetermined limit value. This varies the damper characteristics in compression. The damper characteristics can also be varied in expansion.

17 Claims, 5 Drawing Sheets

HYDRAULIC DAMPER WITH VARIABLE OPERATING CHARACTERISTICS

BACKGROUND OF THE INVENTION

1. Technical field of the invention

The present invention concerns a hydraulic damper designed to be fitted between the chassis or the bodywork of an automobile vehicle and a non-suspended part such as a road wheel of the vehicle, for example.

2. Description of the prior art

The invention relates in particular to dampers comprising a control valve adapted to reduce the damping force from a particular rate of inward (compression) movement of the damper piston rod. Dampers of this type are already known, being described for example in French patent publication No. 2687627. (SIRVEN); to this end they comprise a control valve responsive to the hydraulic fluid pressure and which, when it opens, establishes communication between the two chambers delimited in the damper cylinder by the main piston driven by the damper piston rod. The pressure controlling the control valve is obtained by retarding the flow towards a reservoir of excess fluid due to the reduction in the active volume of the cylinder as a result of the penetration of the piston rod into one of the chambers of the cylinder. If during a rapid inward movement the speed of the piston rod exceeds a limit value the differential pressure acting on the two sides of the control valve increases and, beyond a predetermined limit value, opens the control valve which leads to a rapid reduction in the damping force. There is therefore obtained in this way a damping force which decreases with the rate of inward movement of the damper piston.

The control valve may also be acted on by a substantially constant reference pressure, one side of the control valve then possibly constituting a part of a surface delimiting a reference chamber filled with a reference fluid, for example a gas at a predetermined pressure. This reference chamber may be closed and isolated or vented to the atmosphere or connected to the part of the fluid reservoir filled with gas in such a way as to achieve pressure equilibrium.

European patent publication 3290 (SIRVEN) describes a damper of this type in which the control valve is attached to the piston, instead of being fixed in the cylinder. The hydraulic fluid reservoir is advantageously disposed in the upper part of a tube defining the cylinder, at the opposite end to the piston rod.

In both these known type dampers there is further provided inside the damper a resilient block, made from an elastomer material, for example, capable of varying the active volume of the damper during rapid inward movement of the piston rod and so modifying the operating characteristics during a sudden compression by opening the control valve to increase the pressure inside the damper.

In these known dampers the flow of hydraulic fluid from the reservoir to the cylinder during outward (expansion) movement of the piston rod is virtually unrestricted through a passage connecting the reservoir to the damper cylinder, this passage being provided with a check valve enabling flow only from the reservoir to the cylinder.

There are already known devices for varying the operating characteristics of vehicle dampers of conventional type, whether of single-tube or double-tube construction. These variation devices generally employ solenoid valves opening or closing off oil passages or electric motors adapted to move plungers in flow restrictors through which the oil in the damper passes. These passages or these restrictors create the pressure drop which is at the origin of the damping force. During a compression movement, the damping force is increased because the passage is smaller, this change in operation applying to all rates of compression.

To modify the characteristics of a conventional damper in compression the restrictor control means are in the piston in the case of a single-tube damper which results in difficulties in locating the control means and operating them from the outside. In the case of a double-tube damper, that is to say when the damper cylinder is mounted inside an outer cylindrical jacket which comprises the reservoir, the control means for the restrictors designed to modify the damper characteristics in compression may be disposed either in the piston or in the vicinity of a valve situated at the end of the cylinder.

To modify the characteristics of conventional dampers during an expansion movement consideration has also been given to providing control means to vary the flow rate through flow restrictors provided in the piston itself which results in the previously mentioned difficulties with locating and operating the control means.

An object of the present invention is to modify dampers of the type mentioned in the preamble hereto so as to enable their operating characteristics to be varied at will, and in particular allowing for various parameters related to movement of the vehicle.

SUMMARY OF THE INVENTION

The invention consists in a damper comprising a cylinder adapted to contain a hydraulic fluid, a piston in said cylinder defining first and second chambers in said cylinder, a piston rod in said second chamber, a hydraulic fluid reservoir selectively communicating with said first chamber, a reference chamber adapted to contain a gas at substantially constant pressure, a control valve, a return spring for said control valve which is acted on by the pressure of fluid in said first chamber, tending to open said valve, by said return spring, by the pressure in said reference chamber and by the pressure of fluid in said second chamber, tending to close said valve, a flow restrictor between said reservoir and said first chamber enabling hydraulic fluid to flow only from said first chamber to said reservoir and defining a control pressure to open said valve in response to the rate of inward movement of said piston rod exceeding a predetermined limit value, and means for varying the flow rate permitted by said flow restrictor whereby said valve is opened at rates of inward movement different to said predetermined limit value.

The flow rate variation means may comprise an electric drive motor, advantageously mounted on the body of the vehicle, externally of the damper.

The reference gas pressure acting on the control valve may be atmospheric pressure. Alternatively, it may be a higher pressure, the reference chamber then preferably communicating with the reservoir by a conduit, disposed externally of the damper, for example.

In a single-tube version of the damper in accordance with the invention the reservoir is preferably disposed in the upper part of the cylinder fixed to the body of the vehicle at the opposite end from the piston rod. The control valve is preferably mounted in the piston itself.

In a preferred embodiment of the invention the cylinder is fixed to the body of the vehicle by a resilient block capable of varying the internal volume of the cylinder, so causing the control valve to be opened even before the piston moves in the event of a sudden compression movement.

In another, so-called double-tube form of construction, the cylinder incorporates the control valve and is disposed inside a cylindrical jacket communicating with the fluid reservoir through a flow restrictor. In this embodiment the cylindrical jacket is advantageously fixed to the body of the vehicle by a resilient block capable of varying the internal volume of the cylindrical jacket, which as previously causes the control valve to open in the event of a sudden compression movement before any movement of the piston occurs.

Because of the control means for the flow restrictor enabling hydraulic fluid to flow from the first chamber to the reservoir during a compression movement, it is possible in a damper of this kind to modify the operating characteristics in compression. It will be noted that, unlike what happens in a conventional type damper, a reduction in the flow rate through this restrictor leads to a reduction in the damping force for lower values of the rate of inward movement of the piston rod, given that the reduction in the flow rate to the reservoir during the compression causes the control valve to open faster.

During an expansion movement the control valve is inoperative. The expansion damping force is defined conventionally by the flow restrictors provided in the piston. The hydraulic fluid from the reservoir passes through a simple replenishment valve which authorizes fluid to flow only from the reservoir to the cylinder damper, the replenishment valve causing virtually no significant head loss.

In dampers of this type where a resilient block is placed between a member attached to the body of the vehicle and a member attached to the cylinder of the damper in order to obtain immediate opening of the control valve in the event of a sudden compression movement, consideration can be given to modifying the operating characteristics of the damper during an expansion movement. In these dampers there exists between the road wheel and the body of the vehicle a coupling comprising not only the damper but also a spring member in the form of the resilient block. During an expansion movement this resilient block stretches due to the expansion movement which leads to an increase in the active volume of the first chamber of the damper. At the end of the expansion movement, if the piston rod begins a new rapid compression movement the returning of the resilient block to its non-stretched state causes a sudden increase in pressure which opens the control valve very briefly at the start of the compression movement. Thus in practise there is a slight delay in establishing the damping force at the beginning of the compression movement. Although this effect is imperceptible if the vehicle is moving at a relatively low speed or over relatively smooth terrain, it is more noticeable at high vehicle speeds or on a road comprising sudden deformations of small amplitude.

Another object of the present invention is therefore to modify the stiffness of the resilient linkage between the part of the damper coupled to the road wheels of the vehicle and the body of the vehicle.

In another aspect, the invention therefore consists in a damper comprising a cylinder adapted to contain a hydraulic fluid, a piston in said cylinder defining first and second chambers in said cylinder, a piston rod in said second chamber, a hydraulic fluid reservoir selectively communicating with said first chamber, a reference chamber adapted to contain a gas at substantially constant pressure, a control valve, a return spring for said control valve which is acted on by the pressure of fluid in said first chamber, tending to open said valve, by said return spring, by the pressure in said reference chamber and by the pressure of fluid in said second chamber, tending to close said valve, a flow restrictor between said reservoir and said first chamber enabling hydraulic fluid to flow only from said first chamber to said reservoir and defining a control pressure to open said valve in response to the rate of inward movement of said piston rod exceeding a predetermined limit value, a resilient block by means of which the damper is mounted in its operative position and which is adapted to vary the active volume of the damper, and a flow restrictor and a check valve through which said first chamber is supplied with hydraulic fluid from said reservoir during rapid outward movement of said piston rod, said check valve being such that it reduces the pressure in said first chamber to exert a hydraulic action on said resilient block opposing deformation of said block due to said rapid outward movement, said reference chamber communicating with said reservoir.

Means may be provided for varying the flow rate through said restrictor. The stiffness of the system can then be varied at will. Use may advantageously be made of an electric drive motor mounted on the body of the vehicle externally of the damper.

Where two control means are used, one designed to act during operation in compression and the other during operation in expansion, consideration may be given to using two independent drive motors controlled independently according to parameters related to the movement of the vehicle to which the suspension is fitted. Alternatively a single control motor may be used, provided with a transmission system adapted to act on both control means.

In another aspect, the invention consists in a damper of the previously stated type comprising a cylinder adapted to contain a hydraulic fluid, a piston in said cylinder defining first and second chambers in said cylinder, a piston rod in said second chamber, a hydraulic fluid reservoir selectively communicating with said first chamber, a reference chamber adapted to contain a gas at substantially constant pressure, a control valve, a return spring for said control valve which is acted on by the pressure of fluid in said first chamber, tending to open said valve, by said return spring, by the pressure in said reference chamber and by the pressure of fluid in said second chamber, tending to close said valve, a first flow restrictor between said reservoir and said first chamber enabling hydraulic fluid to flow only from said first chamber to said reservoir and defining a control pressure to open said valve in response to the rate of inward movement of said piston rod exceeding a predetermined limit value, a resilient block disposed between the parts of the damper connected to the body of the vehicle and the other parts of the damper so as to vary the active volume of the damper during rapid compression movement of said piston rod, said reference chamber communicating with said reservoir, and a second flow restrictor and a check valve through which said first chamber is supplied with hydraulic fluid from said reservoir during outward movement of said piston rod. According to the invention, said check valve at said second flow restrictor is such that it reduces the pressure in said first chamber to exert a hydraulic action on said resilient block opposing deformation of said block due to said rapid outward movement.

In an advantageous embodiment the flow restrictor may be associated with means for varying the flow rate through said restrictor. Such means may comprises an electric drive motor mounted on the body of the vehicle externally of the damper.

The invention will be better understood from the following detailed description of various embodiments given by way of non-limiting example only and with reference to the appended diagrammatic drawings.

DESCRIPTION OF THE PREFERRED EMBODIMENTS

Figure 1:
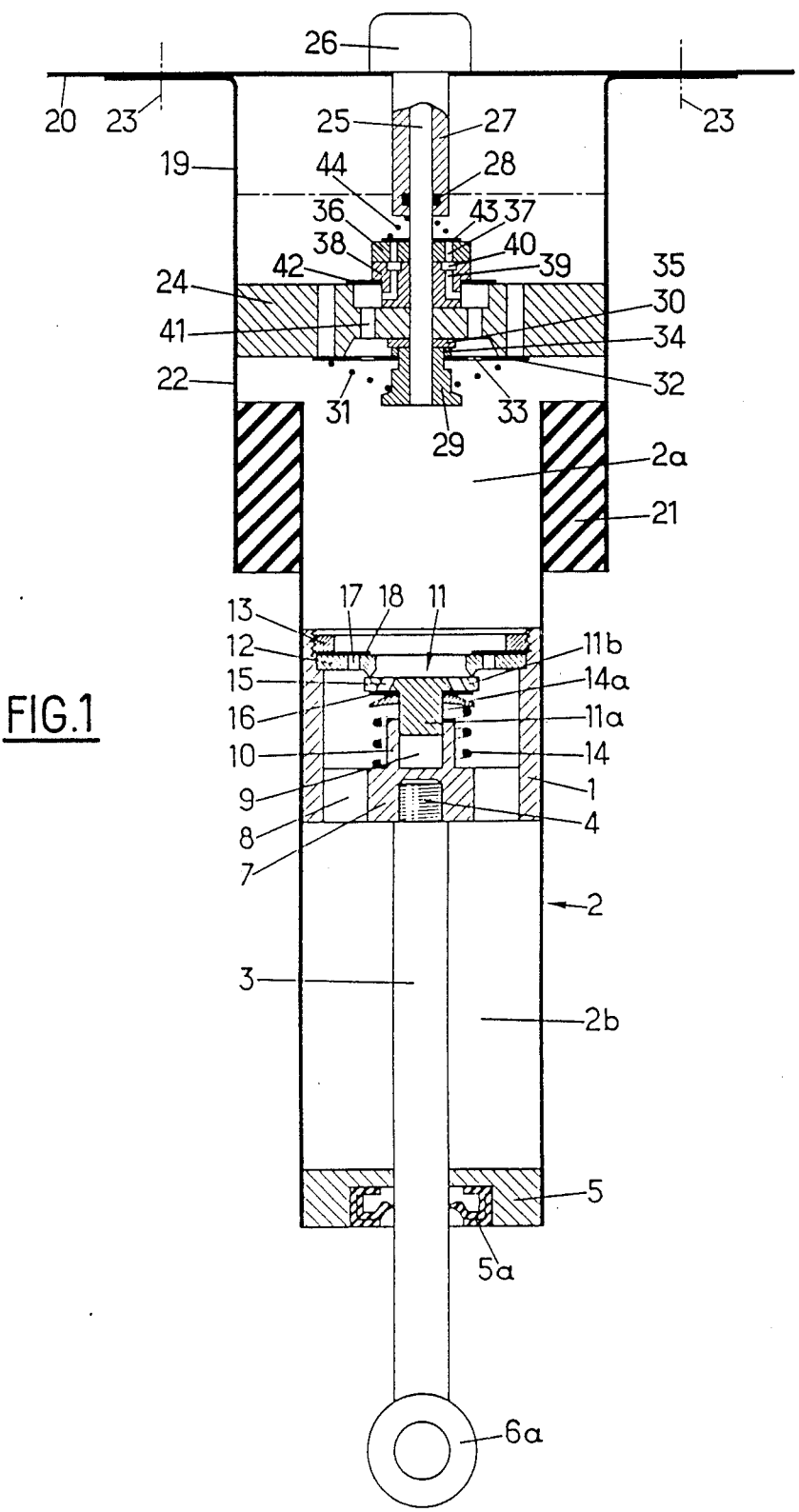
FIG. 1 is a view in cross-section of a first embodiment of the damper in accordance with the invention comprising means for varying the operating characteristics in compression.
Figure 3:
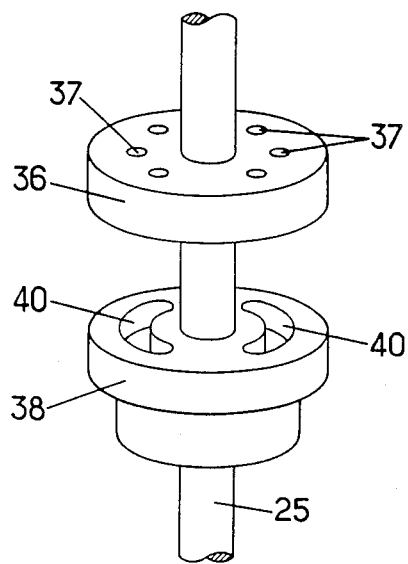
FIG. 3 is an exploded perspective view of two members for varying the flow rate through the flow restrictor provided in the FIG. 1 damper during a compression movement.

As shown in FIGS. 1 and 3 the single-tube type damper in accordance with the invention comprises a piston 1 which slides inside a cylinder 2 and which delimits in the latter a first chamber 2a in front of the piston 1 and a second chamber 2b which contains the piston rod 3 attached to the piston 1 by means of a threaded end 4. Attached to the lower end of the cylinder 2 is a closure member 5 comprising a central bore fitted with a ring seal 5a through which the piston rod 3 passes. At its lower end the piston rod has a fixing ring 6a which can be coupled to a road wheel of an automobile vehicle.

The piston is a hollow member comprising a central core 7 in which is a screwthread receiving the threaded end 4 of the piston rod 3 and attached to side walls of the piston 1 by ribs 8 leaving free passage for the hydraulic fluid. The central core 7 comprises a housing 9 serving as a reference chamber delimited laterally by an annular wall 10 in one piece with the central core 7. The reference chamber 9 is filled with a reference fluid, a gas for example, the pressure of which is substantially constant given the small variable volume of the chamber 9. The top of the chamber 9 is delimited in a movable way by the lower surface of a control valve 11 in the form of an auxiliary piston 11a that can slide in a fluid-tight way inside the chamber 9. To this end the control valve 11 has a lower part 11a which slides inside the chamber 9 and a larger diameter top plate 11b the upper surface of which is in fluid-tight contact with a seat on a washer 12 fixed to the side walls of the piston 1 by a clamping ring 13.

The control valve 11 is urged towards its closed position against the seat on the washer 12 by a spring 14 which bears against a lip on the central core 7 of the piston 1 and on an annular cup member 14a surrounding the lower part 11a of the control valve 11. The plate 11b of the control valve 11 has perforations 15 cooperating with a check valve 16 held against the lower surface of the plate 11b by the cup member 14a and the spring 14 in such a way as to enable limited flow of the hydraulic fluid between the first chamber 2a and the second chamber 2b. The washer 12 further comprises bores 17 cooperating with a check valve 18 clamped between the washer 12 and the clamping ring 13 in such a way as to enable limited flow of hydraulic fluid from the second chamber 2b to the first chamber 2a.

The upper part of the damper is occupied by a hydraulic fluid reservoir 19 fixed direct to the body 20 of the vehicle. The upper part of the cylinder 2 is surrounded by an elastomer resilient block 21 which is attached to the outside wall of the cylinder 2 and to the inside wall of a cylindrical sleeve 22 which extends upwardly to form the reservoir 19 and has at its upper end a flange fixed to the body 20 of the automobile vehicle by means of screws 23. A separator member 24 is fixed to the inside of the sleeve 22 in order to separate the hydraulic fluid in the reservoir 19 from the hydraulic fluid in the first chamber 2a.

The separator member 24 comprises a central bore accommodating a rotatable shaft 25 which extends vertically upwards through the reservoir 19 to a drive motor 26 mounted direct on the body 20 of the vehicle externally of the damper. The shaft 25 enters the reservoir 19 through a sealing and guide sleeve 27 fitted with an appropriate seal 28. After passing through the separator member 24, the shaft 25 is clamped by means of a threaded ring 29 against an anti-friction washer 30 which facilitates rotation of the shaft 25 relative to the fixed separator part 24. The ring 29 has a shoulder on which bears a helical spring 31 operative to close a valve 32 comprising bores 33. The valve 32 is held between the ring 29 and a washer 34. Its edge part closes off a plurality of axial passages 35 in the separator member 24. The stiffness of the valve 32 is such that it exerts virtually no retardation effect on the fluid passing through the passages 35 from the reservoir 19 to the first chamber 2a during expansion movement of the piston 1. The function of the valve 32 is therefore essentially to prevent any flow of hydraulic fluid in the reverse direction, that is to say from the first chamber 2a to the reservoir 19 during compression movement of the piston 1.

A ring 36 in which are two groups of perforations 37 is attached to the rotatable shaft 25 and its lower or front surface is in contact with the upper or front surface of an intermediate member 38 fixed to the separator member 24. Reference to FIG. 3 will give a better understanding of the structure of the members 36 and 38. The intermediate member 38 comprises two passages 39 communicating on its upper or front surface with two curvilinear oblong grooves 40 which can be brought into communication with the bores 37 in the ring 36 as the latter rotates with the shaft 25.

The passages 39 communicate with passages 41 through the separator member 24. A check valve 42 is provided between the intermediate member 38 and the separator member 24 to enable flow of fluid from the first chamber 2a to the reservoir 19 and to prevent any flow of fluid in the reverse direction.

An additional check valve 43 is disposed above the ring 36 and cooperates with a spring 44 to prevent, like the valve 42, any passage of hydraulic fluid from the reservoir 19 to the first chamber 2a.

The action of the motor 26 rotating the shaft 25 causes rotation of the ring 36 such that a greater or lesser number of perforations 37 allows the flow of fluid from the bores 39. The passages that are not closed off throttle the oil flowing from the lower part of the separator member 24, that is to say from the first chamber 2a of the damper. The check valve 42 is relatively stiff so as to enable oil to flow only upwards and this only for high oil flow rates.

Under these conditions the action of the check valve 42 is limited to high rates of compression and the head loss through this valve is greater than the pressure to open the control valve 11.

There will now be given a brief description of how the damper functions during a compression movement of the piston rod 3, that is to say an upward movement in FIG. 1. During a compression movement at relatively low speed, the hydraulic fluid can pass from the first chamber 2a whose volume is decreasing to the second chamber 2b through the passages 15 of the control valve 11, which remains closed. The increased pressure in the chamber 2a generates a damping force which increases rapidly with the rate of inward movement of the piston rod. The control valve 11 is acted on by four different forces:

the force of the spring 14 which tends to close the valve 11;

the pressure $p_1$ in the first chamber 2a which operates on the surface area S of the plate 11b of the control valve 11 in a direction which tends to open said control valve;

the substantially constant pressure $p_4$ of the reference fluid or gas acting on the surface area s of the auxiliary piston 11a and tending to close the control valve 11; and the pressure $p_2$ which operates on the remaining lower surface area of the plate 11b (S-s) and which tends to close the control valve 11.

The pressure $p_1$ in the first chamber 2a increases in proportion to the rate of compression V. The same applies to the difference between the pressures $p_1$ and $p_2$ which also increases in proportion to the rate of compression. It will be noted that the pressure $p_1$ must always be greater than the difference $p_1-p_2$ to prevent the pressure $p_2$ in the second chamber 2b falling below atmospheric pressure which would produce cavitation phenomena prejudicial to the operation of the damper. This result is achieved by an appropriate choice for the stiffness of the valve 42 which enables the pressure $p_1$ to be increased.

Figure 2:
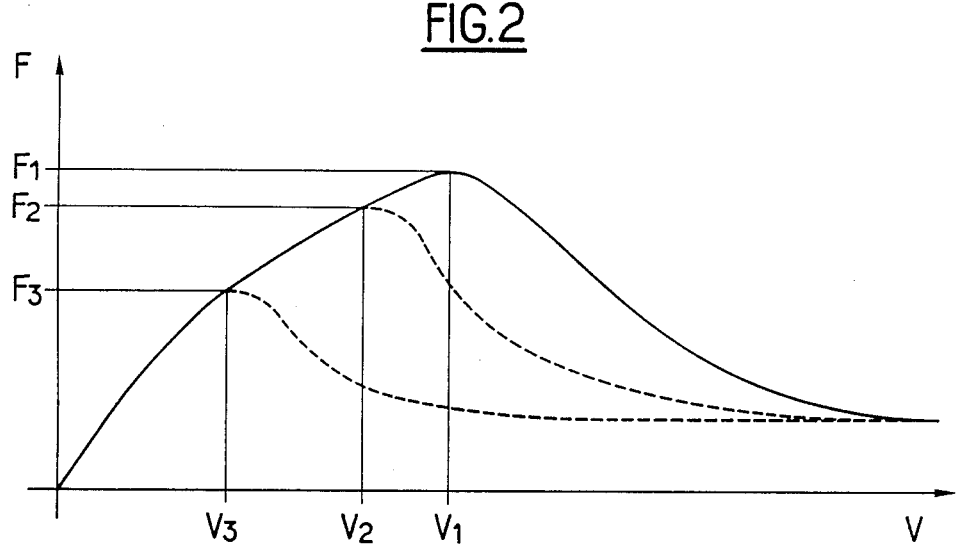
FIG. 2 shows various curves of variation in the damping force as a function of the rate of compression.

When the pressure in the chamber 2a reaches a limit value corresponding to a predetermined limit of the rate of compression the control valve 11 is opened to allow hydraulic fluid to flow directly from the first chamber 2a to the second chamber 2b between the upper surface of the plate 11b and the seat on the washer 12. The difference in pressure between the chambers 2a and 2b decreases as soon as the control valve 11 is open, that is to say beyond the aforementioned limit rate of compression. The result of this is a damping force that decreases when the rate of compression exceeds said limit. The curve of the variation in the damping force F as a function of the rate of compression V of the piston rod is shown in full line in FIG. 2. The maximum value $F_1$ of the damping force appears for the limit rate $V_1$ and depends on the reference pressure in the chamber 9 and on the degree to which the spring 14 is prestressed. It depends also on the flow rate of hydraulic fluid through the separator member 24 through the intermediate member 38 and the ring 36.

Rotation of the ring 36 which changes the number of passages 37 enabling the fluid to flow therefore provides a way of varying the damper characteristics by modifying the time at which the control valve 11 opens. The modified curves are shown in dashed line in FIG. 2. When the motor 26 is operated to reduce the flow rate through the ring 36 the operating pressure of the control valve 11 is increased so that the valve opens for a maximal limit value $V_2$ of the rate of compression which is lower than that ($V_1$) for which the control valve opened at a higher flow rate. The limit value $V_1$ which corresponds to a maximal damping force $F_1$ is therefore obtained for the maximal flow of fluid when all the perforations 37 are opposite grooves 40 and enable fluid to flow to the reservoir 19. If a few of the perforations 37 are no longer operative a new limit value $V_2$ lower than $V_1$ is obtained and the result is a maximal damping force $F_2$ less than the maximal force $F_1$. By further reducing the flow rate it is possible to obtain a maximal rate of compression $V_3$ corresponding to opening of the control valve 11 lower than $V_2$, the corresponding damping force $F_3$ being less than the damping force $F_2$.

In the embodiment shown in FIG. 1 the cylinder 2 is delimited at the top by a resilient block 21 as previously described. It will be noted that the existence of a resilient block 21 of this kind is by no means indispensible and that the damper in accordance with the invention could function perfectly well without any such resilient block.

However, the resilient block 21 comes into play in the event of sudden or very brutal compression of the damper. In this case the resilient block 21 is compressed before any movement of the piston rod 3 occurs. This results in a reduction in the active volume of the first chamber 2a which causes an increase in the pressure in said chamber and the premature opening of the control valve 11. The existence of the resilient block 21 therefore prevents rapid establishing of the damping force, which makes it possible to obtain on the curve shown in FIG. 2 a slightly rounded maximum which makes the suspension more comfortable.

During an expansion movement the damping force is created entirely by the valve 18 which enables limited flow through the passages 17 through the piston 1. The valve 32, which is designed with a very low stiffness, simply serves as a replenishment valve and offers virtually no impediment to the outflow of hydraulic fluid from the reservoir 19.

Figure 4:
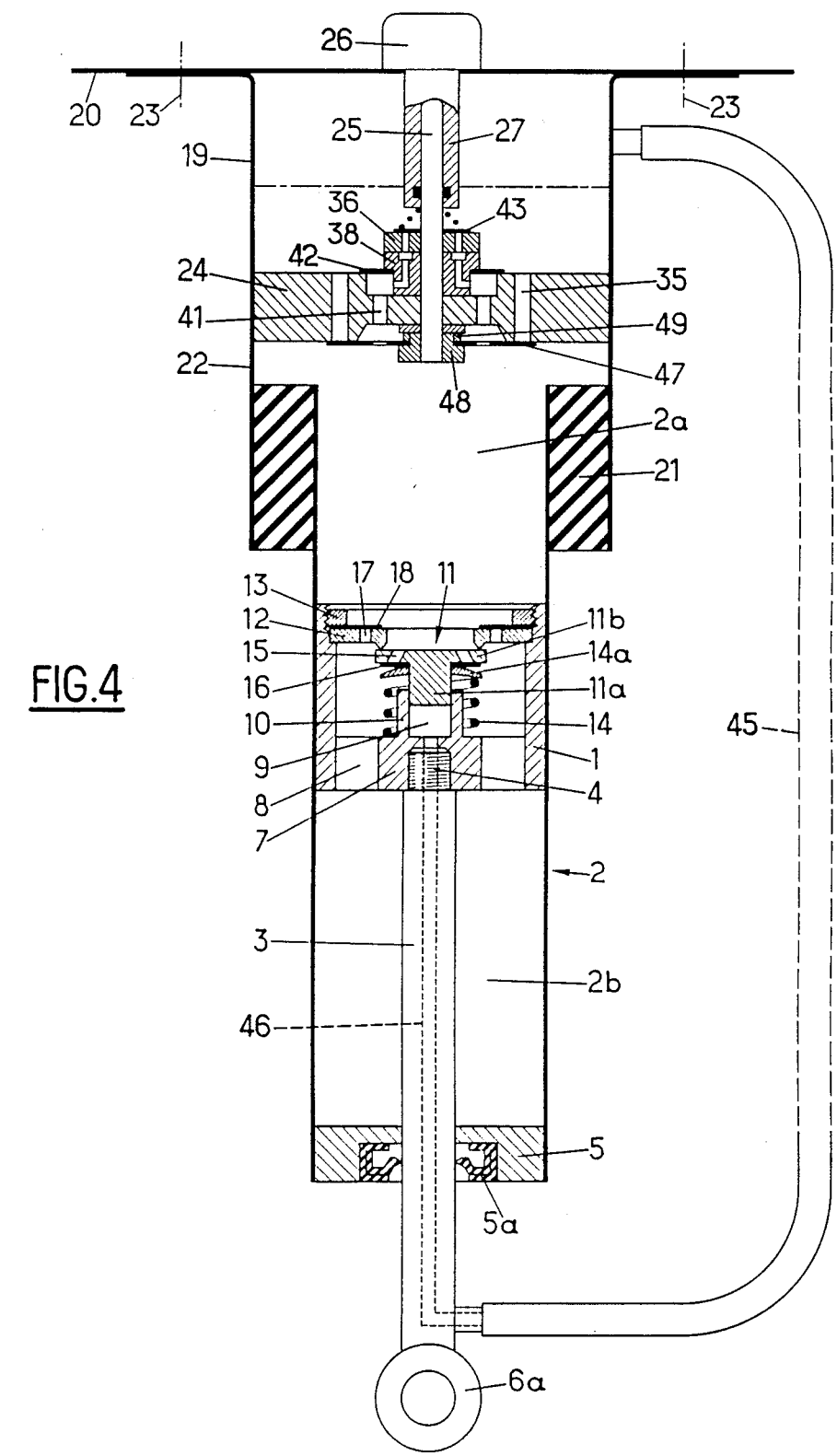
FIG. 4 is a view analogous to FIG. 1 of an embodiment of a damper in accordance with the invention comprising a check valve that is stiffer as compared with the FIG. 1 embodiment in order to act on the resilient block during an expansion movement.

The embodiment shown in FIG. 4, where identical parts carry the same reference numbers, differs from the embodiment of FIG. 1 only in terms of the members designed to function during an expansion movement of the piston rod 3. In this embodiment, which includes the resilient elastomer block 21 delimiting the upper part of the chamber 2a, the reservoir 19 is at a pressure higher than atmospheric pressure to avoid any cavitation of hydraulic fluid in the first chamber 2a during an expansion movement of the piston rod 3. The reservoir 19 communicates via a flexible hose 45 with an axial conduit 46 in the piston rod 3 communicating with the chamber 9. The reference chamber 9 is therefore at the same pressure as the reservoir 19, which is higher than atmospheric pressure.

The FIG. 4 embodiment comprises the same means operated by the motor 26 to modify the flow rate of oil through the separator member 24 during an inward movement of the piston rod 3. However, in this embodiment the check valve 47 is mounted direct between the ring 48 and a spacer 49. The stiffness of the valve 47, the edge part of which shuts off the passages 35, is chosen so that the pressure in the first chamber 2a will drop during rapid outward movement of the piston rod 3. As with the valve 32 in the FIG. 1 embodiment, the valve 47 serves only to replenish the hydraulic fluid from the reservoir 19. It restricts the flow of hydraulic fluid from the reservoir 19 to the chamber 2a to produce a difference in pressure between the reservoir 19 and the chamber 2a during a rapid expansion movement. Note that cavitation is avoided despite this head loss because the reservoir 19 is at a pressure higher than atmospheric pressure.

This pressure difference between the reservoir 19 and the first chamber 2a gives rise to a hydraulic force acting directly on the resilient block 21. This force acts on the resilient block 21 in the direction opposite the force which tends to deform the resilient block by pulling it in the downward direction during outward movement of the piston rod 3.

In the FIG. 1 embodiment, where the valve 32 is of negligible stiffness, a rapid expansion movement causes deformation of the resilient block 21, the cylinder 2 being drawn down by the outward movement of the piston rod 3. It is as if a damper mounted on elastic ball-joints were provided between the body of the vehicle and the road wheel. This elasticity renders the suspension soft at low speeds. However, it results in a tendency to ineffective damping of wheel bounce on ground featuring small irregularities when the vehicle is travelling at high speed. During a compression movement following on from an expansion movement, the return of the resilient block 21 to its non-stretched state reduces the active volume of the first chamber 2a which causes the control valve 11 to open.

In the FIG. 4 embodiment, and because of the choice of a stiff valve 47, the resilient block 21 can be arranged so as to hardly deform at all during an expansion movement as a result of the hydraulic force due to the pressure difference between the reservoir 19 and the chamber 2a balancing the opposing force due to the expansion movement. It is as if the damper were mounted on ball-joints without any elasticity between the body of the vehicle and the road wheel. The expansion damping curve has not been changed, only the characteristics of the coupling between the damper and the body of the vehicle.

It will be noted that when the damper is pressurized without there being any movement of the piston rod 3 the resilient block 21 deforms due to the static pressure, the hydraulic force balancing the tension in the resilient block.

The immediately foregoing description essentially concerns variation in pressure relative to this static pressure, due to the head loss caused by the valve 47 introducing a restriction between the reservoir 19 and the first chamber 2a.

Figure 5:
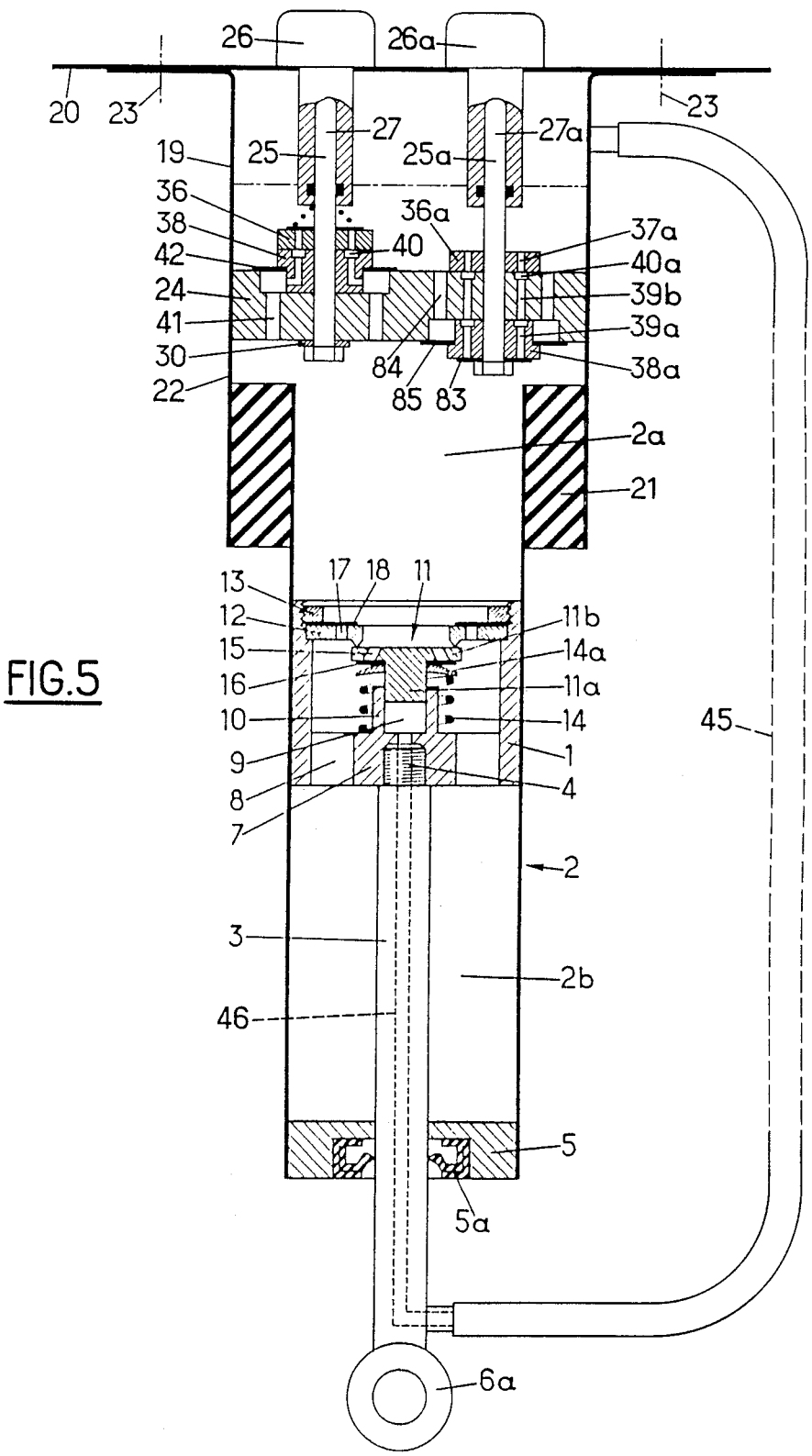
FIG. 5 is a view analogous to FIG. 1 of another embodiment of a damper in accordance with the invention comprising two control devices for operating on the characteristics of the damper during a compression movement and during an expansion movement.

The FIG. 5 embodiment shows by way of example an application of the invention to a damper whose general construction is identical to that of the dampers shown in FIGS. 1 and 4 but which comprises independently controlled means for varying the operating characteristics of the damper not only during a compression movement but also during an expansion movement. In this figure the same parts carry the same reference numbers. The separator member 24' is fitted in two systems functioning alternately during a compression movement or during an expansion movement. For a compression movement the control means on the left in FIG. 5 similar to those already shown in FIGS. 1 and 4 are operative. They comprise in particular the motor 26 rotating the shaft 25 with which the ring 36 is constrained to rotate so as to cooperate with the intermediate member 38 to open a greater or lesser passage for fluid from the first chamber 2a to the reservoir 19, the fluid passing through the member 24' by means of the passages 41. It also comprises the check valve 42. In this embodiment the shaft 25 is simply clamped against the separator member 24' by a nut in friction contact with the ring 30.

To vary the operating characteristics of the damper during an expansion movement there are provided on the righthand side in FIG. 5 control means of the same kind for which the reference numbers carry the subscript a. These means therefore comprise a motor 26a also mounted externally of the damper beside the motor 26 and rotating a shaft 25a which carries a ring 36a constrained to rotate with the shaft 25a which is guided by the sleeve 27a. The intermediate member 38a is fixed to the other side of the separator member 24 and has the rotatable shaft 25a passing through it, secured by a nut at the end. The intermediate member 38a comprises passages 39a while the curved grooves 40a which have the same function as the grooves 40 in the intermediate member 38 are formed directly on the upper, front surface of the separator member 24 in order to cooperate with the various passages 37a in the ring 36a which are arranged in groups as were the passages 37 in the ring 36. The hydraulic fluid can therefore pass through a number of the passages 37a and then the grooves 40a and passages 39b in the separator member 24, before entering the passages 39a in the intermediate member 38a. A check valve 83 of very low stiffness prevents the fluid flowing through the separator member 24' in the opposite direction, in other words from the first chamber 2a to the reservoir 19.

Operation of the motor 26a tending to reduce the flow rate through the passages 37a will produce, as explained for the FIG. 4 embodiment, a hydraulic action on the resilient block 21 increasing the stiffness of the coupling between the damper and the body of the vehicle during an expansion movement.

For very high rates of expansion the separator member 24' further comprises passages 84 shut off by a relatively stiff check valve 85 between the separator member 24' and a shoulder on the intermediate member 38a.

The drive motors 26 and 26a are normally associated with potentiometers or angular encoders for sensing the position of the shafts 25 and 25a to ensure that the flow rate of fluid commanded through the various restrictions is the required flow rate. It is equally possible to use for the motors 26 and 26a stepping motors which are systematically returned to a preset position when the vehicle is started. The exact position of the shafts 25 and 25a is then measured by counting up and down pulses causing the motors to rotate in one sense or the other.

It will be noted that the structure of the controlled means as described up to this point, that is to say comprising the rotatable shafts 25 and 25a carrying the rotatable rings 36 and 36a, may be replaced by other conventional type means. In particular, consideration may be given to varying the flow rate through a restriction by means of a plunger moving vertically, for example due to the action of a rotating shaft cooperating with the threaded end of the plunger so as to convert rotation of the shaft into translation of the plunger. Plungers of this kind can equally well be controlled by means of solenoids providing just two adjustment positions.

It will be noted that the characteristics of the damper in accordance with the invention may be varied easily by means situated in a part of the damper coupled to the body of the vehicle which makes it possible to dispose the electrical control unit (such as the motors 26 and 26a) outside the oil-filled enclosure of the damper. The couplings between the parts modifying the flow rate though the restrictions and the control members such as the motors 26 and 26a are provided by rigid shafts.

The motors 26 and 26a may be controlled independently of each other by controllers C1 and C2 which may be connected to vehicle parameter indicators I1 and I2 as schematically shown in FIG. 5. Consideration may also be given in some cases to simplifying the control system by operating in the same way on the two motors 26 and 26a or even by replacing them with a single motor connected to the control means by two appropriate transmission systems.

Figure 6:
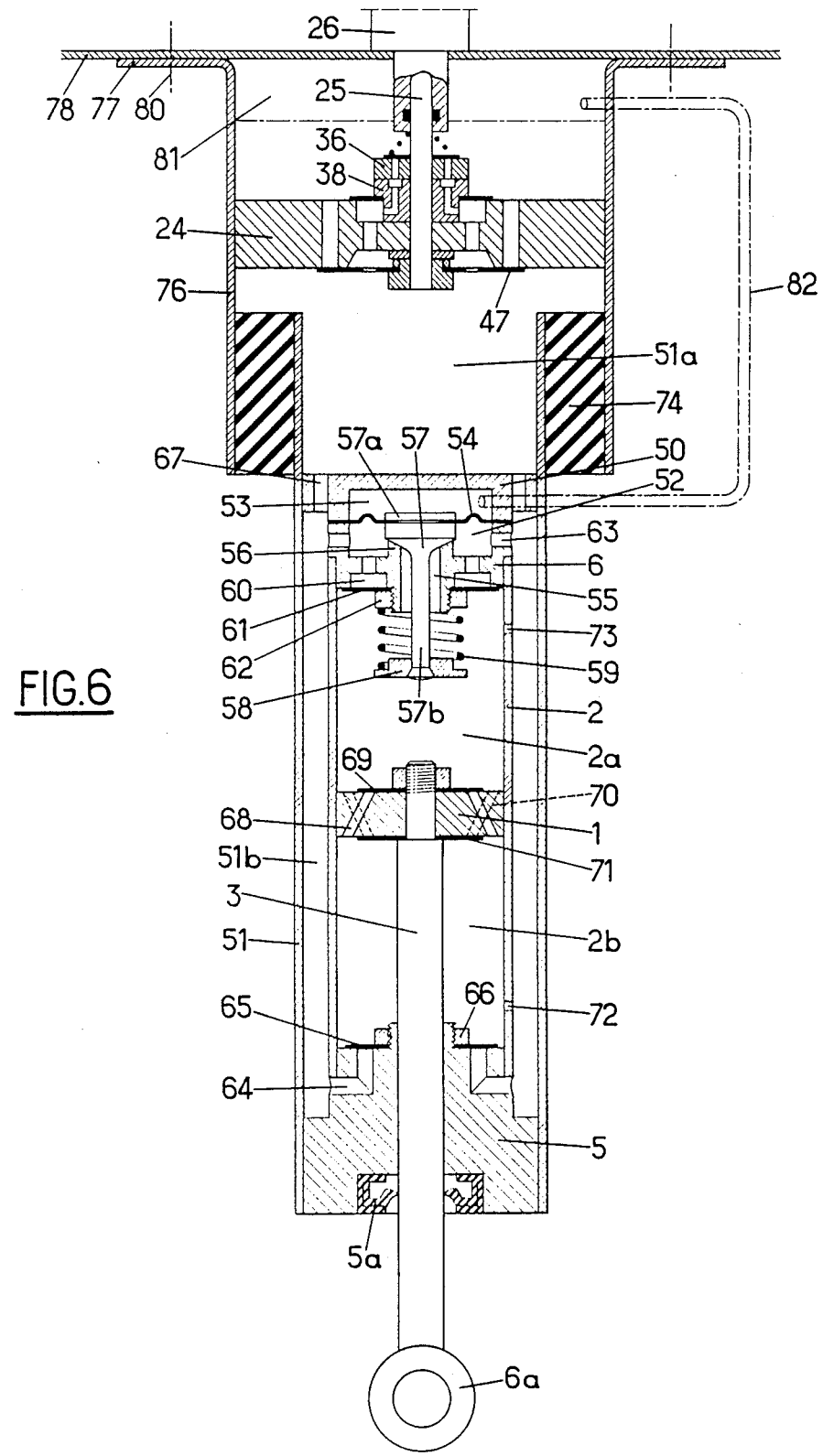
FIG. 6 is a view analogous to FIG. 1 of a further embodiment of the damper in accordance with the invention having a double-tube construction.

The FIG. 6 embodiment shows by way of example an application of the invention to a double-tube type damper. In FIG. 6, where the same parts carry the same reference numbers as in previous figures, the cylinder 2 comprises in its upper part a control member 6 to which is fixed by appropriate means (not shown) an upper closure member 50. A cylindrical outer jacket 51 concentric with the cylinder 2 accommodates all components of the damper and is attached to the lower closure member 5 and to the upper closure member 50.

The control member 6 delimits with the upper closure member 50 an intermediate space 52 and a reference chamber 53 separated by a gas-tight flexible diaphragm 54 clamped between respective front surfaces of the control member 6 and the upper closure member 50. The reference chamber 53 is filled with a gas at a substantially constant reference pressure.

The control member 6 comprises a central bore 55 in the upper part of which is a valve seat 56 on which bears a substantially conical portion of the control valve 57 which has an upper part 57a attached to the diaphragm 54.

The valve 57 has at the end opposite its portion 57a a stem 57b which passes through the bore 55 and carries at its end a washer 58 against which bears a return spring 59 of the control valve 57 which bears also on the control member 6.

The control member 6 further comprises passages 60 through which communication can be established between the intermediate space 52 and the first chamber 2a of the cylinder. A check valve 61 of very low stiffness secured by a nut 62 prevents circulation of hydraulic fluid from the first chamber 2a to the intermediate space 53. The control member 6 further comprises radial passages 63 enabling circulation of hydraulic fluid in both directions between the delimited by the cylinder 2 and the concentric outer jacket 51. Passages 64 and a check valve 65 of very low stiffness secured by a nut 66 are provided in the lower member 5 to enable circulation of hydraulic fluid from prevent it in the opposite direction.

The upper closure member 50 comprises passages 67 establishing communication between the annular space 51b and the portion 51a of the outer jacket 51 situated above the closure member 50. The piston 1 comprises passages 68 cooperating with a stiff check valve 69 to enable limited flow of hydraulic fluid from the second chamber 2b to the first chamber 2a and to prevent any circulation in the opposite direction. The piston 1 also comprises passages 70 cooperating with a stiff check valve 71 to enable limited circulation of hydraulic fluid from the first chamber 2a to the second chamber 2b and to prevent any circulation in the opposite direction. Calibrated orifices 72 and 73 are provided in the wall of the cylinder 2 in the vicinity of its lower part and upper part, respectively.

The upper end of the cylindrical outer jacket 51 is closed by an elastomer resilient block 74 which is attached to the outside wall of the jacket 51 and has its outside peripheral surface attached to the inside of a cylindrical sleeve 76 which is extended upwardly and has at the top a flange 77 by means of which the sleeve 76 may be fixed to the body of the automobile vehicle 78 by means of screws 80.

The sleeve 76 contitutes the reservoir of the damper and contains a gas in its upper part 81. A flexible hose 82 establishes communication between the part 81 of the reservoir and the reference chamber 53 so that said chamber and the reservoir may be pressurized to a pressure higher than atmospheric pressure.

The portion 51a of the cylindrical jacket 51 is separated from the reservoir by a separator member 24 which has the same structure as that already described with reference to the FIG. 4 embodiment. It therefore comprises the control motor 26 which rotates the ring 36 to vary the flow rate of hydraulic fluid from the upper portion 51a to the reservoir 81 during inward movement of the piston rod 3 which results, according to the rotation of the shaft 25, in a modification to the operating characteristics in compression as was already the case with the FIG. 4 embodiment.

A stiff check valve 47 is shown here, having the same characteristics as that shown in FIG. 4. During outward movement of the piston rod 3 the same effect on the resilient block 74 is obtained as previously described.

The various embodiments shown, whether in the single-tube or double-tube version, may without difficulty be adapted to an automobile vehicle suspension in which the damper is placed inside and concentric with the main suspension spring, that is to say a MacPherson type suspension.

The damper operating characteristics may also be varied manually, either by direct action on the damper or remotely by means of a mechanical linkage.

In the event that electrical control means are employed, the motor or motors which vary the operating characteristics of the damper in compression or in expansion or in both compression and expansion may be controlled according to a number of parameters related to the functioning and movement of the vehicle. These parameters are principally:

The speed of the vehicle. The suspension is as a general rule made softer at low speeds by closing the flow restrictor for the fluid entering the reservoir during a compression movement and opening the flow restrictor for the fluid leaving the reservoir during an expansion movement.

A steering indication obtained by reading the lock angle of the steering or possibly by a transverse accelerometer or by your rate gyro. The dampers on the outside of the turn are then made harder in compression.

A braking indication obtained by reading the position of the brake pedal or by measuring the brake fluid pressure or by means of a longitudinal accelerometer. During braking the front dampers are hardened in compression.

An acceleration indication obtained by reading the position of the accelerator pedal and the ratio of the vehicle gearbox or by means of a longitudinal accelerometer. During acceleration the rear dampers are hardened in compression.

An indication that the suspension is bottoming which can be obtained either at each road wheel or at each axle by measuring the displacement o the center point of the roll bar. When the suspension is in the high position it is necessary to harden the damper characteristic in compression and possibly to harden the coupling between the damper and the vehicle body in expansion. In the case of a position measurement use may be made either of the direct measurement produced by a rheostat, for example, or a measurement that has been slightly filtered to eliminate spurious high-frequency information.

The dampers in accordance with the invention therefore make it possible to allow for these various parameters which can be processed by a microprocessor to modify the operating characteristics of the dampers to allow for the functioning and displacement of the vehicle.

I claim:

1. A damping device comprising a cylinder containing a hydraulic fluid,
    a piston movable in the cylinder and dividing the cylinder into a first chamber and a second chamber,
    a rod connected to said piston and extending through said second chamber for actuating said piston in said cylinder,
    a hydraulic fluid reservoir selectively communicating with said first chamber and not in direct communication with the second chamber,
    a flow restricting passage means between said reservoir and said first chamber enabling hydraulic fluid to flow only from said first chamber to said reservoir, said restricting passage means causing the pressure in the first chamber to increase in response to piston compression movement toward the first chamber,
    a control valve on said piston biased in closed position by a return spring and acted on by the pressure of fluid in said first chamber tending to open said valve and by the pressure of fluid in said second chamber tending to close said valve,
    a reference chamber containing a gas at substantially constant pressure and located in said piston, to act on said control valve to close said valve,
    and means for varying the flow rate permitted by said flow restricting passage means, said varying means defining a limit value of the rate of compression movement of the piston at which the control valve is opened in response to an increase of the pressure in the first chamber and causing a decrease of the damping force in response to any rapid piston compression movement.

2. The damping device of claim 1, wherein said means for varying the flow rate permitted by said flow restricting passage means includes an electric drive motor mounted externally of the damping device.

3. A damping device according to claim 2, further comprising means for controlling said electric drive motor in response to signals that indicate parameters related to movement of a vehicle to which the damping device is fitted.

4. A damping device according to claim 1, wherein said reference chamber communicates with said reservoir.

5. A damping device according to claim 4, wherein there is at least one other electric drive motor connected to the damping device, and said control means controls said electric drive motor independently of said other electric drive motor.

6. A damping device according to claim 1, wherein said reservoir is in an upper part of said cylinder, at the opposite end thereof from said piston rod.

7. A damping device according to claim 1, further comprising a resilient block means for mounting the damping device in its operative position and for varying the internal volume of said cylinder.

8. A damping device according to claim 7, wherein said reference chamber communicates with said reservoir, and further including a flow restrictor and a check valve means for supplying said first chamber with hydraulic fluid from said reservoir during rapid outward movement of said piston rod, said check valve means reducing the pressure in said first chamber to exert a hydraulic action on said resilient block opposing deformation of said block due to said rapid outward movement.

9. A damping device according to claim 8 further comprising means for varying the flow rate through said restrictor.

10. A damping device according to claim 9, said varying means including an electric drive motor mounted externally of the damping device.

11. A damping device according to claim 10, further comprising means for controlling said electric drive motor in response to signals that indicate parameters related to movement of a vehicle to which the damping device is fitted.

12. A damping device comprising a cylinder containing a hydraulic fluid,
    a piston movable in the cylinder and dividing the cylinder into a first chamber and a second chamber,
    a rod connected to said piston and extending through said second chamber for actuating said piston in said cylinder,
    a hydraulic fluid reservoir selectively communicating with said first chamber and not in direct communication with the second chamber,
    a first flow restricting passage means between said reservoir and said first chamber enabling hydraulic fluid to flow only from said first chamber to said reservoir, said restricting passage means causing the pressure in the first chamber to increase in response to piston compression movement toward the first chamber.
    a control valve on said piston biased in closed position by a return spring and acted on by the pressure of fluid in said first chamber tending to open said valve and by the pressure of fluid in said second chamber tending to close said valve, a reference chamber containing a gas at substantially constant pressure higher than atmospheric pressure and located in said piston, to act on said control valve to close said valve, said reference chamber communicating with said reservoir, a resilient material element mounting the damping device in its operative position and located in the damping device in such a way as to be able to vary the volume of the first chamber, a second flow restricting passage means between said reservoir and said first chamber enabling hydraulic fluid to flow from said reservoir into said first chamber during rapid piston expansion movement toward second chamber, and a check valve cooperating with said second flow restricting passage means, said check valve having stiffness characteristics such as to cause the pressure in the first chamber to be reduced in response to a rapid expansion movement of the piston toward the second chamber, whereby the pressure difference between the reservoir and the first chamber produces a hydraulic force exerted on said resilient material element opposing deformation of said element due to said rapid expansion movement.

13. A damping device comprising a cylinder containing a hydraulic fluid,
　a piston movable in the cylinder and dividing the cylinder into a first chamber and a second chamber,
　a rod connected to said piston and extending through said second chamber for actuating said piston in said cylinder,
　a hydraulic fluid reservoir selectively communicating with said first chamber and not in direct communication with the second chamber,
　a first flow restricting passage means between said reservoir and said first chamber enabling hydraulic fluid to flow only from said first chamber to said reservoir, said restricting passage means causing the pressure in the first chamber to increase in response to piston compression movement toward the first chamber,
　a control valve on said piston biased in closed position by a return spring and acted on by the pressure of fluid in said first chamber tending to open said valve and by the pressure of fluid in said second chamber tending to close said valve,
　a reference chamber containing a gas at substantially constant pressure higher than atmospheric pressure and located in said piston, to act on said control valve to close said valve, said reference chamber communicating with said reservoir,
　a resilient material element mounting the damping device in its operative position and located in the damping device in such a way as to be able to vary the volume of the first chamber,
　a second flow restricting passage means between said reservoir and said first chamber enabling hydraulic fluid to flow from said reservoir into said first chamber during rapid piston expansion movement toward the second chamber,
　a check valve cooperating with said second flow restricting passage means, said check valve having stiffness characteristics such as to cause the pressure in the first chamber to be reduced in response to a rapid expansion movement of the piston toward the second chamber, whereby the pressure difference between the reservoir and the first chamber produces a hydraulic force exerted on said resilient material element opposing deformation of said element due to said rapid expansion movement,
　and means for varying the flow rate permitted by said first flow restricting passage means, said varying means defining a limit value of the rate of compression movement of the piston at which the control valve is opened in response to an increase of the pressure in the first chamber and causing a decrease of the damping force in response to rapid piston compression movement.

14. A damping device according to claim 13, further including second means for varying the flow rate permitted by said second flow restricting passage means.

15. A damping device according to claim 14, said second varying means including an electric drive motor mounted externally of the damping device.

16. A damping device comprising a cylinder containing a hydraulic fluid,
　a piston movable in the cylinder and dividing the cylinder into a first chamber and a second chamber,
　a rod connected to said piston and extending through said second chamber for actuating said piston in said cylinder,
　a reservoir,
　means defining an intermediate space,
　means external to said first chamber for providing fluid communication between said intermediate space and said second chamber,
　a spring biased control valve coupling said first chamber and said intermediate space and acted on by the fluid pressure in said first chamber tending to open said valve,
　a flow restricting passage means between said reservoir and said intermediate space,
　a movable wall member defining one wall of said intermediate space and integrally connected with said control valve,
　a reference chamber including said movable wall member, said reference chamber containing a gas at a substantially constant pressure acting on said movable wall member and said control valve to close said valve,
　and means for varying the flow rate permitted by said flow restricting passage means, said varying means defining a limit value of the rate of compression movement of the piston at which the control valve is opened in response to an increase of the pressure in the intermediate space and causing a decrease of the damping force,
　said varying means comprising a rotatable ring having perforations therein and cooperating with fixed curvilinear passages and a check valve enabling limited flow of fluid toward the reservoir.

17. A damping device comprising a cylinder containing a hydraulic fluid,
　a piston movable in the cylinder and dividing the cylinder into a first chamber and a second chamber,
　a rod connected to said piston and extending through said second chamber for actuating said piston in said cylinder, a reservoir, means defining an intermediate space, means external to said first chamber for providing fluid communication between said intermediate space and said second chamber, a spring biased control valve coupling said first chamber and said intermediate space and acted on by the fluid pressure in said first chamber tending to open said valve, a first flow restricting passage means between said reservoir and said intermediate space, a movable wall member defining one wall of said intermediate space and integrally connected with said control valve, a reference chamber including said movable wall member, said reference chamber containing a gas at a substantially constant pressure acting on said movable wall member and said control valve to close said valve, an outer jacket having said cylinder and said control valve arranged therein in a fixed position, said outer jacket communicating with said reservoir through said first flow restricting passage means and communicating with said intermediate space, and means for varying the flow rate permitted by said first flow restricting passage means, said varying means defining a limit value of the rate of compression movement of the piston at which the control valve is opened in response to an increase of the pressure in the intermediate space and causing a decrease of the damping force, a resilient material element mounting the outer jacket in its operative position and located in the damping device in such a way as to be able to vary the internal volume of said outer jacket, a second flow restricting passage means between said reservoir and said outer jacket enabling hydraulic fluid to flow from said reservoir into said outer jacket during rapid piston expansion movement toward the second chamber, a check valve cooperating with said second flow restricting passage means, said check valve having stiffness characteristics, to cause the pressure in the outer jacket and in the intermediate space to be reduced in response to a rapid expansion movement of the piston toward the second chamber whereby the pressure difference between the reservoir and outer jacket produces a hydraulic force exerted on said resilient material element opposing deformation of said element due to said rapid expansion movement.

* * * * *